(12) United States Patent
Kizaki

(10) Patent No.: US 8,977,550 B2
(45) Date of Patent: Mar. 10, 2015

(54) INFORMATION PROVIDING APPARATUS AND INFORMATION PROVIDING METHOD

(75) Inventor: Tokujiro Kizaki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 978 days.

(21) Appl. No.: 13/102,197

(22) Filed: May 6, 2011

(65) Prior Publication Data
US 2011/0288870 A1    Nov. 24, 2011

(30) Foreign Application Priority Data

May 24, 2010  (JP) ................................. 2010-118694

(51) Int. Cl.
*G10L 13/06* (2013.01)
*G01C 21/36* (2006.01)

(52) U.S. Cl.
CPC ........ *G01C 21/3697* (2013.01); *G01C 21/3629* (2013.01)
USPC ........... 704/258; 704/267; 704/270; 704/271; 701/9; 701/39; 455/3.06; 718/101

(58) Field of Classification Search
CPC ......... G10L 13/08; G10L 13/04; G10L 13/07; G10L 13/02; G10L 15/22; G10L 15/30; G10L 17/26; G10L 15/265; G10L 25/78; G10L 13/043; G10L 15/02; G10L 17/20; G10L 17/22; G10L 21/025; H05K 999/99; G01C 5/005; G01C 21/36; G01C 21/3608; G01C 21/20; G01C 21/3629; G01C 21/30; B60G 17/0185; B62D 7/159; B60R 21/0132; B60R 25/24; B60R 2300/105; G09B 29/10; G09B 21/009; H04H 60/27; H04W 48/18; H04W 72/10; H04W 4/10; H04W 76/005; H04W 84/08; H04B 1/50; H04B 1/54; G06F 9/466; G06F 9/4881; G06F 9/4843; G06F 9/4887; G06F 9/3851; G06F 9/4812; F16H 2061/0087; G08G 1/096861
USPC .............. 704/267, 270, 270.1, 271, 274, 275, 704/E11.004, E13.008, E15.04, E17.014, 704/E17.015, E21.015; 701/9, 39, 43, 45, 701/58, 538, 539, 515, 488, 487, 443, 442, 701/441, 439, 435, 431, 428, 423, 419, 701/418; 455/3.06, 435.3, 512, 527; 718/101, 102, 103
See application file for complete search history.

(56) References Cited

U.S. PATENT DOCUMENTS

2003/0006889 A1 *  1/2003  Koike ........................... 340/435
(Continued)

FOREIGN PATENT DOCUMENTS

JP          2002-236029 A      8/2002
(Continued)

*Primary Examiner* — Vincent P Harper
(74) *Attorney, Agent, or Firm* — Birch, Stewart, Kolasch & Birch, LLP

(57) ABSTRACT

Part units of speech information are arranged in a predetermined order to generate a sentence unit of a speech information set. To each of a plurality of speech part units of the speech information, an attribute of "interrupt possible after reproduction" with which reproduction of priority interrupt information can be started after the speech part unit of the speech information is reproduced or another attribute of "interrupt impossible after reproduction" with which reproduction of the priority interrupt information cannot be started even after the speech part unit of the speech information is reproduced is set. When the priority interrupt information having a high priority rank than the speech information set being currently reproduced is inputted, if the attribute of the speech information being reproduced at the point in time is "interrupt impossible after reproduction," then the priority interrupt information is reproduced after the speech information is reproduced.

14 Claims, 6 Drawing Sheets

(56) References Cited

U.S. PATENT DOCUMENTS

2005/0143915 A1* 6/2005 Odagawa et al. ............. 701/211
2008/0195785 A1* 8/2008 Herczog ....................... 710/264
2009/0064155 A1* 3/2009 Giuli et al. .................... 718/103

FOREIGN PATENT DOCUMENTS

| | | |
|---|---|---|
| JP | 3923572 B2 | 6/2007 |
| JP | 2007-212574 A | 8/2007 |
| JP | 2009-302788 A | 12/2009 |
| JP | 2010-014653 A | 1/2010 |

* cited by examiner

| ATTRIBUTE | INTERRUPT POSSIBLE AFTER REPRODUCTION | INTERRUPT IMPOSSIBLE AFTER REPRODUCTION | OMISSION POSSIBLE | OMISSION IMPOSSIBLE |
|---|---|---|---|---|
| CHARACTE-RISTIC | SPEECH INFORMATION INCLUDING NOUN (PHRASE) VERB (PHRASE) | SPEECH INFORMATION WITH WORDS OF "INTERRUPT IMPOSSIBLE AFTER REPRODUCTION" OMITTED | SPEECH INFORMATION WITH WORDS OF "OMISSIONG IMPOSSIBLE" OMITTED | SPEECH INFORMATION REPRESENTATIVE OF DIRECTION AND OBJECT TO WHICH ATTENTION IS TO BE PAID |
| EXAMPLE | IN CASE OF "BE CAREFUL! A VEHICLE TO TURN TO THE RIGHT IS IN THE FORWARD INTERSECTION" ||||
| EXAMPLE | INTERSECTION / RIGHTWARDLY TURNING VEHICLE / IS / BE CAREFUL / DO | FORWARDLY / AT / BY | INTERSECTION / IN / BY / IS / BE CAREFUL / DO | FORWARDLY / RIGHTWARDLY TURNING VEHICLE |
| EXCEPTION | | SPEECH INFORMATION DISPOSED FORWARDLY OF SPEECH INFORMATION WHICH CANNOT BE OMITTED | | NEXT WORD CONNECTING TO PARTICLE OR ADJECTIVE BEING CURRENTLY REPRODUCED |
| EXCEPTION | | INTERSECTION | | IS |

FIG. 3

INFORMATION PROVIDING APPARATUS AND INFORMATION PROVIDING METHOD

CROSS-REFERENCE TO RELATED APPLICATIONS

The present application claims priority under 35 USC 119 to Japanese Patent Application No. 2010-118694 filed on May 24, 2010 the entire contents of which are hereby incorporated by reference.

BACKGROUND OF THE INVENTION

1. Field of the Invention

This invention relates to an information providing apparatus and an information providing method. More particularly to an information providing apparatus and an information providing method which provide information inputted from the outside of a self vehicle as speech information.

2. Description of Background Art

In recent years, a system is being developed for receiving the latest information from the outside of a self vehicle through road-vehicle communication carried out between the self vehicle and an antenna installed on a road and vehicle-vehicle communication carried out between the self vehicle and another vehicle as means for providing various kinds of information to an occupant of the self vehicle. If this road-vehicle communication and the vehicle-vehicle communication are utilized, then current road regulation information or traffic signal information, position information, operation information and so forth of a different vehicle or the like can be acquired based on a real-time basis. Therefore, for example, when emergency information or the like of a higher priority rank is received, it is possible to interrupt the information provision currently proceeding and provide emergency information or the like preferentially.

In Japanese Patent No. 3923572, a navigation apparatus is disposed wherein, if, when predetermined information is being provided, information of a higher priority rank than the information being currently provided is interrupted and the priority information is provided, whereafter the information whose provision has been interrupted is provided again.

However, with the technique disclosed in Japanese Patent No. 3923572, when predetermined priority information is inputted as speech information, it is not taken into consideration in what manner the speech information being currently reproduced is to be interrupted in order to provide the priority information. In particular, it is considered that, in the case of speech information, interruption of speech being provided (reproduced) may give rise to an uncomfortable feeling, or it may become rather difficult to grasp the significance of the priority information by connection of the speech before the interruption and the speech of the priority information. Therefore, it is a significant problem in what manner speech information being currently provided is to be interrupted.

SUMMARY AND OBJECTS OF THE INVENTION

It is an object of an embodiment of the present invention to solve the problem of the prior art described above and provide an information providing apparatus and an information providing method wherein an interrupting method of speech information being currently provided is devised so that priority information can be provided comprehensively and effectively.

In order to attain the object described above, the present invention has a first characteristic in that an information providing apparatus (1) which generates speech information to be provided to an occupant of a self vehicle based on various kinds of information inputted to the self-vehicle includes a speech information storage section (9) for storing a plurality of speech part units of speech information (W), speech information set generation means (5) for arranging the speech part units of speech information (W) stored in the speech information storage section (9) in a predetermined order to generate a sentence unit of a speech information set (S), and priority interrupt information processing means (6) for interrupting, if priority interrupt information (Y1) having a higher priority rank than the speech information set (S) is inputted during reproduction of the speech information set (S), the reproduction of the speech information set (S) being currently reproduced and starting reproduction of the priority interrupt information (Y1), the priority interrupt information processing means (6) interrupting, when the priority interrupt information (Y1) having a higher priority rank than the speech information (W) being currently reproduced is inputted, the reproduction of the speech information set (S) being currently reproduced at a point in time later than a point in time at which the priority interrupt information (Y1) is inputted and then starting reproduction of the priority interrupt information (Y1).

Further, according to an embodiment of the present invention, a second characteristic is provided in that, if the priority interrupt information (Y1) having a higher priority rank than the speech information (W) being currently reproduced is inputted, then the priority interrupt information processing means (6) starts reproduction of the priority interrupt information (Y1) after at least reproduction of speech part unit of speech information (W1, W3) being currently reproduced at a point in time at which the priority interrupt information (Y1) is inputted is completed.

Further, according to an embodiment of the present invention, to each of the plural speech part units of speech information (W), one of an attribute of "interrupt possible after reproduction" with which reproduction of the priority interrupt information (Y1) can be started after the speech information (W) is reproduced and another attribute of "interrupt impossible after reproduction" with which reproduction of the priority interrupt information (Y1) cannot be started even after the speech information is reproduced, and when the priority interrupt information (Y1) having a higher priority rank than the speech information set (S) being currently reproduced is inputted, if the attribute of a speech part unit of speech information (W4) being reproduced at the point in time is "interrupt possible after reproduction," then the priority interrupt information processing means (6) starts reproduction of the priority interrupt information (Y1) after the speech part unit of speech information (W4) of the speech part unit is reproduced, but when the attribute of the speech part unit of speech information (W3) being reproduced at a point in time at which the priority interrupt information (Y1) is inputted is "interrupt impossible after reproduction, the priority interrupt information processing means (6) continues the reproduction of the speech information set (S) and then starts reproduction of the priority interrupt information (Y1) after the reproduction of the speech part unit of speech information (W4) whose attribute is "interrupt possible after reproduction" and which is scheduled to be reproduced subsequently is completed.

Further, according to an embodiment of the present invention, to each of the plural speech part units of the speech information (W) stored in the speech information storage section (9), one of the attributes of "omission possible" and "omission impossible" is further applied, and if, when the priority interrupt information (Y1) having a higher priority rank than the speech information set (S) being currently reproduced is inputted, the attribute of the speech part unit of speech information (W4) being reproduced at the point in time is "interrupt possible after reproduction," then the priority interrupt information processing means (6) starts reproduction of the priority interrupt information (Y1) after the speech part unit of speech information (W4) is reproduced, but if the attribute of the speech part unit of speech information (W3) being reproduced at a point in time at which the priority interrupt information (Y1) is inputted is "interrupt impossible after reproduction," then the priority interrupt information processing means (6) continues the reproduction of the speech information set (S) omitting those speech part units of speech information (W2, W3) whose attribute is "omission possible" and which is disposed before the speech part unit of speech information (W4) whose attribute is "interrupt possible after reproduction" and which is scheduled to be reproduced subsequently and then starts reproduction of the priority interrupt information (Y1) after the reproduction of the speech part unit of speech information (W4) whose attribute is "interrupt possible after reproduction" and which is scheduled to be reproduced subsequently is completed.

Further, according to an embodiment of the present invention, the speech information storage section (9) applies the attribute "omission impossible" to the speech part unit of speech information (W) corresponding to a direction to which an occupant is to pay attention and an object of the attention.

Further, according to an embodiment of the present invention, the speech information storage section (9) applies the attribute "interrupt possible after reproduction" to the speech part unit of speech information (W) corresponding to a noun, a noun phrase, a verb or a verb phrase.

Further, according to an embodiment of the present invention, the information providing apparatus (1) is a navigation apparatus which includes wireless communication means (21) for transmitting and receiving various kinds of information inputted to the self vehicle from the outside of the self vehicle through vehicle-vehicle communication or road-vehicle communication.

Further, according to an embodiment of the present invention, an information providing method for generating speech information to be provided to an occupant of a self vehicle based on various kinds of information inputted to the self vehicle includes arranging a plurality of stored speech part units of speech information (W) in a predetermined order to generate a sentence unit of a speech information set (S) to be provided to an occupant of the self vehicle, interrupting, if priority interrupt information (Y1) having a higher priority rank than the speech information set (S) is inputted during reproduction of the speech information set (S), the reproduction of the speech information set (S) being currently reproduced and starting reproduction of the priority interrupt information (Y1), and starting, when the priority interrupt information (Y1) having a higher priority rank than the speech information (W) being currently reproduced is inputted, reproduction of the priority interrupt information (Y1) at least after the reproduction of the speech part unit of speech information (W1, W3) being reproduced at a point in time at which the priority interrupt information (Y1) is inputted is completed.

Further, according to an embodiment of the present invention, the various kinds of information are transmitted and received through vehicle-vehicle communication or road-vehicle communication.

According to an embodiment of the present invention, the information providing apparatus includes a speech information storage section for storing a plurality of speech part units of speech information, speech information set generation means for arranging the speech part units of speech information stored in the speech information storage section in a predetermined order to generate a sentence unit of a speech information set, and priority interrupt information processing means for interrupting, if priority interrupt information having a higher priority rank than the speech information set is inputted during reproduction of the speech information set, the reproduction of the speech information set being currently reproduced and starting reproduction of the priority interrupt information, the priority interrupt information processing means interrupting, when the priority interrupt information having a higher priority rank than the speech information being currently reproduced is inputted, the reproduction of the speech information set being currently reproduced at a point in time later than a point in time at which the priority interrupt information is inputted and then starting reproduction of the priority interrupt information. Therefore, it is possible to prevent an uncomfortable feeling from being caused by interruption of reproduction during reproduction of a speech part unit of speech information.

According to an embodiment of the present invention, if the priority interrupt information having a higher priority rank than the speech information being currently reproduced is inputted, then the priority interrupt information processing means starts reproduction of the priority interrupt information after at least reproduction of speech part unit of speech information being currently reproduced at a point in time at which the priority interrupt information is inputted is completed. Therefore, it is possible to prevent an uncomfortable feeling from being caused by interruption of the reproduction at an intermediate portion of a speech part unit of speech information. Consequently, a minimum amount of important information (word) necessary for operating can be transmitted briefly to the occupant.

According to an embodiment of the present invention, to each of the plural speech part units of speech information, one of an attribute of "interrupt possible after reproduction" with which reproduction of the priority interrupt information can be started after the speech information is reproduced and another attribute of "interrupt impossible after reproduction" with which reproduction of the priority interrupt information cannot be started even after the speech information is reproduced, and when the priority interrupt information having a higher priority rank than the speech information set being currently reproduced is inputted, if the attribute of a speech part unit of speech information being reproduced at the point in time is "interrupt possible after reproduction," then the priority interrupt information processing means starts reproduction of the priority interrupt information after the speech part unit of speech information of the speech part unit is reproduced, but when the attribute of the speech part unit of speech information being reproduced at a point in time at which the priority interrupt information is inputted is "interrupt impossible after reproduction, the priority interrupt information processing means continues the reproduction of the speech information set and then starts reproduction of the priority interrupt information after the reproduction of the speech part unit of speech information whose attribute is "interrupt possible after reproduction" and which is scheduled to be reproduced subsequently is completed. Therefore, by defining the attribute of interrupt possible after reproduction or interrupt impossible after reproduction in a speech part unit, an uncomfortable feeling arising from interruption of a sentence at an intermediate portion can be moderated. Consequently, an uncomfortable feeling or a sudden feeling is eliminated from a word of the speech information, and it becomes possible for the occupant to recognize the contents of the priority interrupt information more readily.

According to an embodiment of the present invention, to each of the plural speech part units of the speech information stored in the speech information storage section, one of attributes of "omission possible" and "omission impossible" is further applied, and if, when the priority interrupt information having a higher priority rank than the speech information set being currently reproduced is inputted, the attribute of the speech part unit of speech information being reproduced at the point in time is "interrupt possible after reproduction," then the priority interrupt information processing means starts reproduction of the priority interrupt information after the speech part unit of speech information is reproduced, but if the attribute of the speech part unit of speech information being reproduced at a point in time at which the priority interrupt information is inputted is "interrupt impossible after reproduction," then the priority interrupt information processing means continues the reproduction of the speech information set omitting those speech part units of speech information whose attribute is "omission possible" and which is disposed before the speech part unit of speech information whose attribute is "interrupt possible after reproduction" and which is scheduled to be reproduced subsequently and then starts reproduction of the priority interrupt information after the reproduction of the speech part unit of speech information whose attribute is "interrupt possible after reproduction" and which is scheduled to be reproduced subsequently is completed. Therefore, by defining a speech part unit of speech information which can be omitted, the time before reproduction of the priority interrupt information is started can be reduced without causing an uncomfortable feeling.

According to an embodiment of the present invention, the speech information storage section applies the attribute "omission impossible" to the speech part unit of speech information corresponding to a direction to which an occupant is to pay attention and an object of the attention. Therefore, the time before reproduction of the priority interrupt information is started can be reduced without omitting important information to which the occupant is to pay attention.

According to an embodiment of the present invention, the speech information storage section applies the attribute "interrupt possible after reproduction" to the speech part unit of speech information corresponding to a noun, a noun phrase, a verb or a verb phrase. Therefore, for example, such a situation that, immediately before reproduction of the priority interrupt information is started, such a particle as "by" or "in" is reproduced and consequently the speech information having been reproduced till then and the priority interrupt information connect to each other in a context, can be prevented. Consequently, it becomes possible to prevent the meaning of the priority interrupt information from becoming difficult to grasp.

According to an embodiment of the present invention, the information providing apparatus is a navigation apparatus which includes wireless communication means for transmitting and receiving various kinds of information inputted to the self vehicle from the outside of the self vehicle through vehicle-vehicle communication or road-vehicle communication. Therefore, it becomes possible to receive real-time information received through vehicle-vehicle communication or road-vehicle communication and further receive and provide priority interrupt information of a high priority rank to the occupant.

According to an embodiment of the present invention, the information providing method includes arranging a plurality of stored speech part units of speech information in a predetermined order to generate a sentence unit of a speech information set to be provided to an occupant of the self vehicle, interrupting, if priority interrupt information having a higher priority rank than the speech information set is inputted during reproduction of the speech information set, the reproduction of the speech information set being currently reproduced and starting reproduction of the priority interrupt information, and starting, when the priority interrupt information having a higher priority rank than the speech information being currently reproduced is inputted, reproduction of the priority interrupt information at least after the reproduction of the speech part unit of speech information being reproduced at a point in time at which the priority interrupt information is inputted is completed. Therefore, it is possible to prevent an uncomfortable feeling from being caused by interruption of reproduction at an intermediate portion of a speech part unit of speech information.

According to an embodiment of the present invention, the various kinds of information are transmitted and received through vehicle-vehicle communication or road-vehicle communication. Therefore, it becomes possible to receive real-time information received through vehicle-vehicle communication or road-vehicle communication and further receive and provide priority interrupt information of a high priority rank to the occupant.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 3 is a view illustrating attributes applied to speech part units of speech information and natures of the attributed;

DETAILED DESCRIPTION OF THE PREFERRED EMBODIMENTS

In the following, a preferred embodiment of the present invention is described in detail with reference to the drawings.

Figure 1:
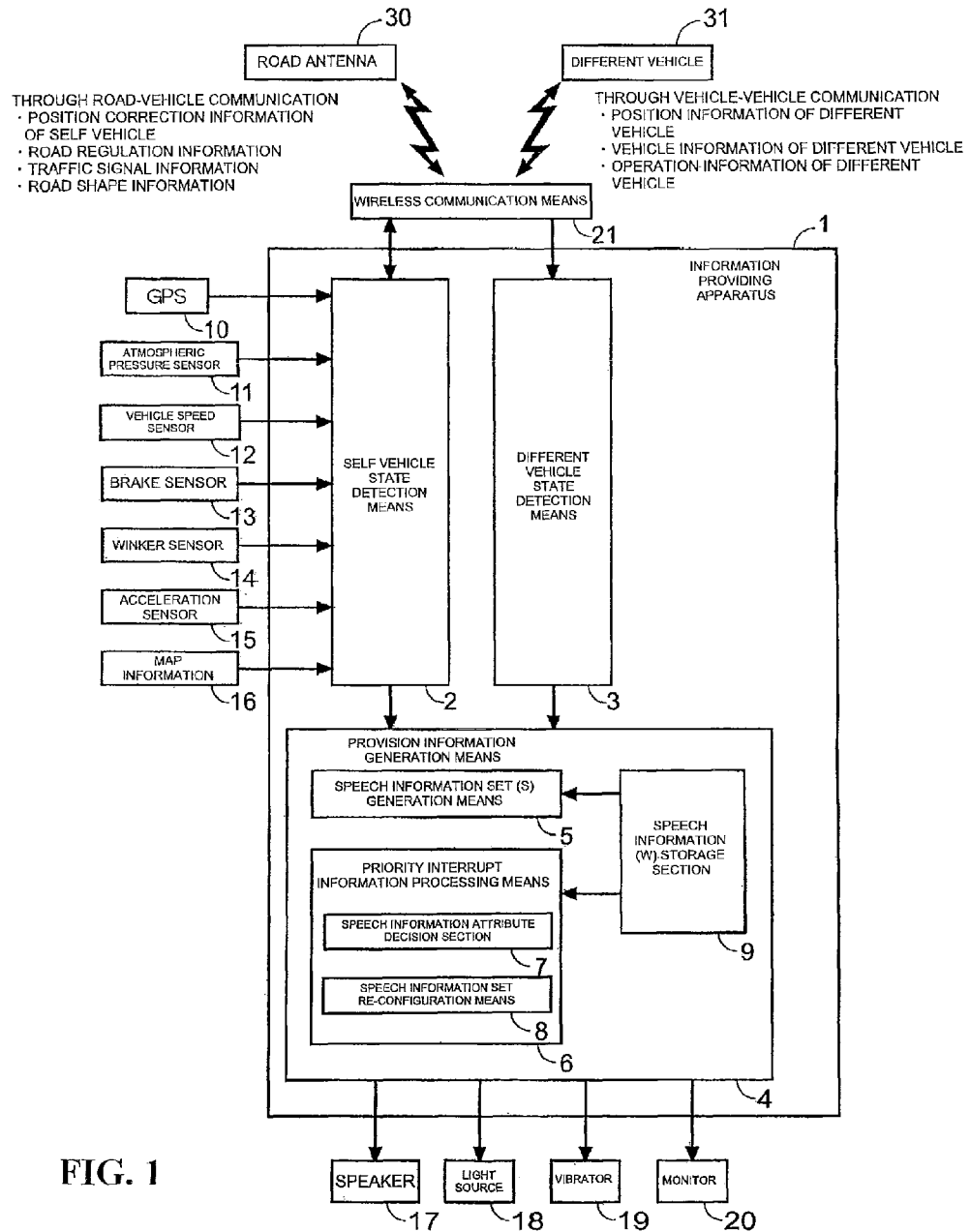
FIG. 1 is a block diagram showing a configuration of an information providing apparatus according to an embodiment of the present invention.

FIG. 1 is a block diagram showing a configuration of an information providing apparatus 1 according to an embodiment of the present invention. The information providing apparatus 1 includes self vehicle state detection means 2 for detecting a state of a self vehicle (hereinafter referred to sometimes simply as self car), a different vehicle state detection means 3 for detecting a state of a different vehicle (hereinafter referred to sometimes simply as different car), and provision information generation means 4 for generating various kinds of information to be provided to an occupant of the self vehicle based on information from the self vehicle state detection means 2 and the different vehicle state detection means 3. It is to be noted that the information providing apparatus 1 can be configured to include a navigation apparatus of a vehicle. It is to be noted that the information providing apparatus 1 may not be a navigation apparatus but a dedicated apparatus of the vehicle-vehicle communication and the road-vehicle communication.

To the self vehicle state detection means 2, information from a GPS (Global Positioning System) 10 for receiving signals from GPS satellites to detect the self car position, an atmospheric pressure sensor 11 for detecting an altitude, a vehicle speed sensor 12 for detecting a car speed, a brake sensor 13 for detecting an operation state of a brake system, a blinker sensor 14 for detecting an operation state of a blinker system (turn signal) and an acceleration sensor 15 for detecting an acceleration state of the car body and map information 16 for indicating the position of the self car detected by the GPS 10 on a map are inputted.

The self vehicle state detection means 2 can detect a position or an operating state of the self car, an operational state of an occupant and so forth based on the input information described above. Consequently, the self vehicle state detection means 2 can presume and detect, for example, based on the fact that "the brake system is rendered operative and the right side blinker apparatus is rendered operative and then the vehicle moves to a right turn lane, that the self car is making preparations for turning to the right at an intersection. Further, the self vehicle state detection means 2 can presume and detect, based on the fact that "acceleration is started in a lane junction of a highway and the right side blinker apparatus is rendered operative," that the self car is joining the main lane of a highway."

Further, to the self vehicle state detection means 2 and the different vehicle state detection means 3, information from wireless communication means 21 is inputted. The wireless communication means 21 can receive position correction information of the self car, road regulation information, traffic signal information, road shape information and so forth through road-vehicle communication with a road antenna 30 installed on a road. Further, the wireless communication means 21 can transmit and receive position information of a different car, vehicle information of the different car, and operational information of the different car through vehicle-vehicle communication with a different vehicle 31 which has a communication function similar to that of the self car. According to this vehicle-vehicle communication, it is possible to detect not only an approaching speed, an approaching direction and so forth of a different vehicle with respect to the self car but also, for example, that a different vehicle is making preparations for turning to the right at an intersection and so forth.

Then, by combining the self vehicle state and various kinds of information received through the road-vehicle communication and the vehicle-vehicle communication, for example, in the case where an oncoming vehicle waiting for the right turn exists at an intersection across which the self vehicle is to go straightforwardly, even in the case where an occupant cannot be visually observed because it is hidden behind the different vehicle or from a like reason, it is possible to use speech or the like to notify the occupant of the self vehicle of the existence of the vehicle waiting for the right turn. At this time, if the oncoming vehicle waiting for the right turn begins to turn to the right during passage of the self vehicle through the intersection, then also it is possible to preferentially notify the occupant of the fact as emergency information having a high priority rank in place of the information being currently provided.

Although the information providing apparatus 1 according to the present embodiment is basically configured such that it provides various kinds of information to be provided to an occupant as speech information reproduced by a speaker 17, also it is possible to configure the information providing apparatus 1 such that it provides lighting or flickering of a light source 18, vibration of a vibrator 19, image or character display by a monitor 20 or the like together with the speech information.

The provision information generation means 4 which generates information to be provided to the occupant of the self vehicle includes a speech information storage section 9 for storing a plurality of units of parts of speech of speech information. The provision information generation means 4 further includes speech information set generation means 5 for generating a speech information set of a unit of a sentence by arranging a plurality of speech part units of speech information stored in the speech information storage section 9 in a predetermined order. The provision information generation means 4 further includes priority interrupt information processing means 6 for interrupting, if, during reproduction (provision) of a predetermined speech information set, priority interrupt information having a higher priority rank than the speech information set being reproduced (provided) is inputted, the reproduction (provision) of the speech information set being currently reproduced (provided) and carrying out reproduction (provision) of the priority interrupt information.

The information inputted from the outside of the self vehicle includes various kinds of information from that relating to weather information to a warning regarding approach to a different vehicle. However, in the present embodiment, the provision information generation means 4 is configured such that priority ranks are applied in advance to the various kinds of information and comparison and so forth between the priority ranks of information being currently reproduced and newly inputted information are carried out by the priority interrupt information processing means 6. When information having a higher priority rank than information being currently reproduced is inputted and besides it is necessary to stop the reproduction of the speech information proceeding at present and transmit the information having the higher priority rank to the occupant, the priority interrupt information processing means 6 renders speech information attribute decision section 7 and speech information set re-configuration means 8 hereinafter described operative.

It is to be noted that the priority rank of information is set based on an operation support to the occupant. The operation support level is set such that it increases in the order of information provision<alert<alarm<control (brake assist and so forth). If different pieces of information having an equal operation support level are inputted, then priority is applied to that piece of information which relates to an object of attention to which the distance from the self vehicle is shorter.

Figure 2:
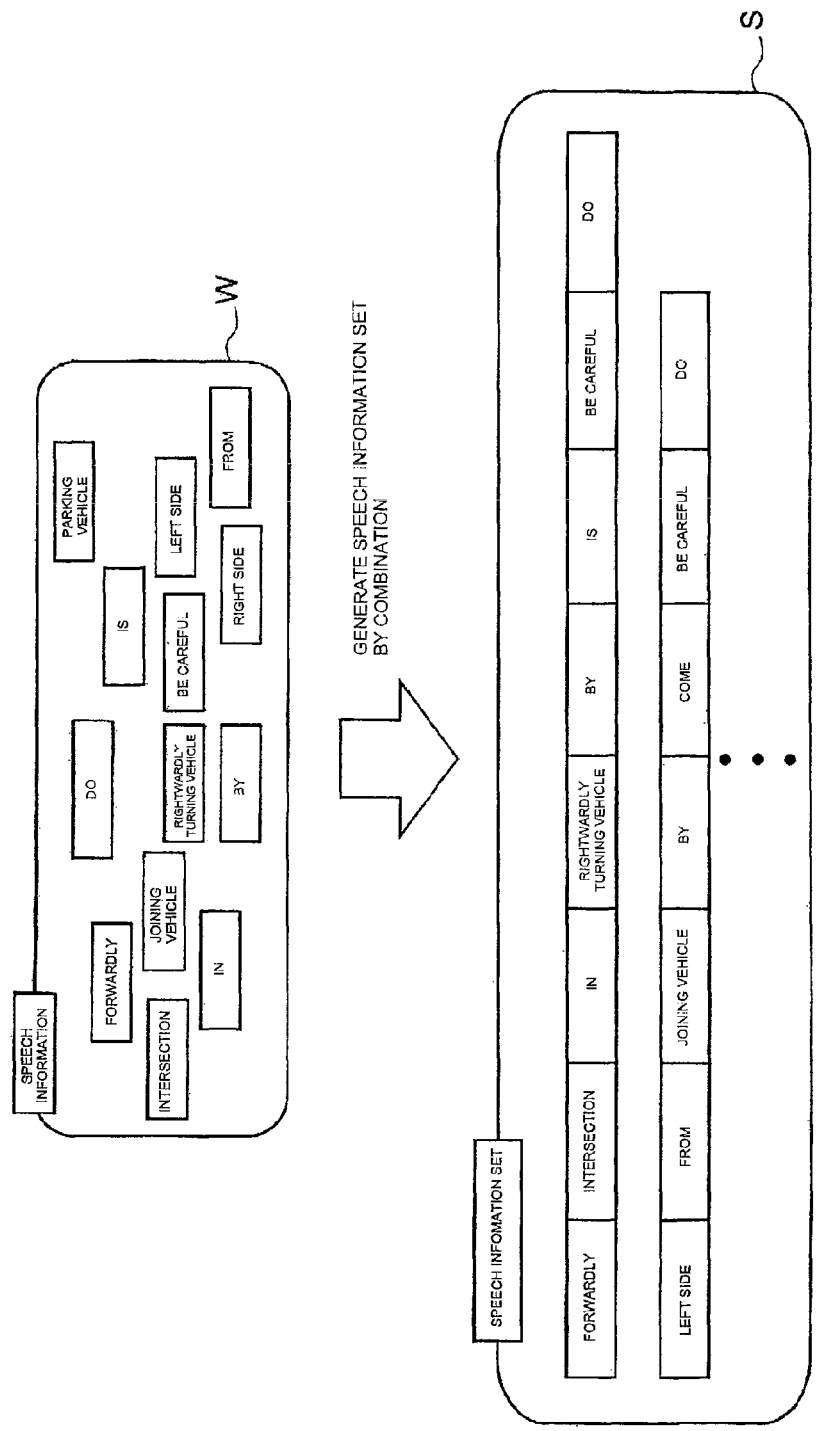
FIG. 2 is a schematic view of speech part units of speech information and a speech information set stored in speech information.

FIG. 2 is a schematic view of speech part units of speech information W and speech information sets S stored in the speech information storage section 9. In the speech information storage section 9, a plurality of speech part units of speech information W such as, for example, "forward," "intersection," "rightwardly turning vehicle," "to," "by" or "do" are stored.

The speech information set generation means 5 (refer to FIG. 1) configures information selected so as to be provided to the occupant at present as a speech information set S based on information inputted from the self vehicle state detection means 2 and the different vehicle state detection means 3. The speech information set S which is speech information of a unit of a sentence such as, for example, "Be careful! A vehicle to turn to the right is in the forward intersection" is generated by arranging a plurality of speech part units of speech information W in a predetermined order.

FIG. 3 is a table indicative of attributes applied to the speech part units of speech information W and characteristics of the attributes. Predetermined attributes are individually applied to the speech part units of speech information W stored in the speech information storage section 9. Such setting of attributes is referred to in order to interrupt, when, during reproduction of predetermined speech information, priority interrupt information having a higher priority rank than the speech information being currently reproduced, the reproduction of the speech information being currently reproduced. In FIG. 3, an example in the case where the speech information set S being currently reproduced is "Be careful! A vehicle to turn to the right is in the forward intersection."

The priority interrupt information processing means 6 is set such that, when, during reproduction of predetermined speech information, priority interrupt information having a higher priority rank than the speech information being currently reproduced is inputted, the priority interrupt information processing means 6 interrupts the reproduction of the speech information being currently reproduced at a point in time later than the point in time (timing) at which the priority interrupt information is inputted and then reproduces the priority interrupt information. In particular, the priority interrupt information processing means 6 is set such that, even when priority interrupt information having a priority rank higher than predetermined speech information being currently reproduced is inputted during reproduction of the speech information being currently reproduced, unless at least the reproduction of the speech part unit of speech information W being currently reproduced does not come to an end, reproduction of the priority interrupt information is not carried out. Consequently, such a situation that the ending of the speech information W is cut incomplete to give rise to an uncomfortable feeling can be prevented, and the occupant can recognize the contents of the priority interrupt information.

The "interrupt possible after reproduction" as one of the attributes indicated in the table signifies that reproduction of priority interrupt information can be started after this speech information is reproduced. This attribute "interrupt possible after reproduction" is given to such nouns (phrases) as "intersection," "rightwardly turning vehicle," "is," "attention" and so forth.

Further, the "interrupt impossible after reproduction" as one of the attributes signifies that reproduction of priority interrupt information cannot be started even after this speech information is reproduced. This attribute "interrupt impossible after reproduction" is applied to those words other than the words of the attribute "interrupt possible after reproduction," in particular, in the example illustrated in FIG. 3, "forwardly," "to" and "by."

Further, the "omission possible" and the "omission impossible" as attributes are taken into consideration only in the case where the attribute of speech information of a speech part unit being reproduced at a point in time at which priority interrupt information is inputted is "interrupt impossible after reproduction."

In particular, in the case where the attribute of the speech information being reproduced at a point in time at which priority interrupt information is inputted is "interrupt impossible after reproduction," if speech information whose attribute is "omission possible" is disposed forwardly of speech information whose attribute is "interrupt possible after reproduction" and which is scheduled to be reproduced next, then the speech information is omitted. However, if the attribute of the speech information is "omission impossible," then the speech information is reproduced without being omitted. Distinction among such attributes as described above is executed by the speech information attribute decision section 7 of the priority interrupt information processing means 6. In the example of FIG. 3, the attribute "omission impossible" is applied to the words of "forwardly" and "rightwardly turning vehicle" representative of the direction and the object to which attention is to be paid, and the attribute "omission possible" is applied to the other words, that is, to "intersection," "in," "by," "is," "attention" and "do."

It is to be noted that it is possible to provide various exceptions to the application of the attributes. For example, although the attribute of the speech information "intersection" normally is "interrupt possible after reproduction," it changes to "interrupt impossible after reproduction" in the case where the speech information is disposed in front of the speech information whose attribute is "omission impossible."

Further, the attribute of the speech information "is" is set such that, although it normally is "omission possible," it changes to the "omission impossible" in the case where the speech information becomes a next word which connects to a particle or an adjective. In particular, the attribute of the speech information "is" changes to "omission impossible" during reproduction of the speech information "by" disposed immediately prior to the speech information "is."

In the following, an interrupt process for priority information which makes use of the attributes of the speech information according to the present embodiment is described with reference to FIGS. 4 and 5.

Figure 4:
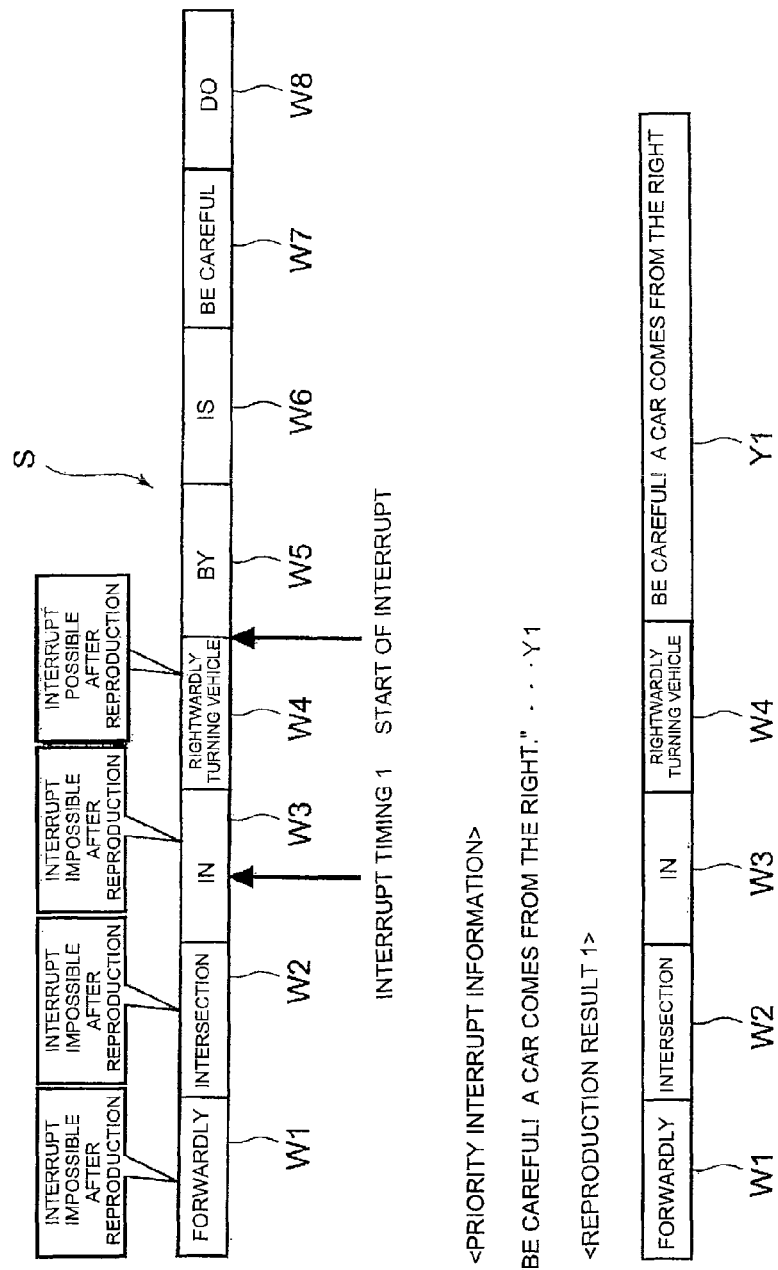
FIG. 4 is a schematic view illustrating a flow of processing in the case where priority interrupt information is inputted during the provision of speech information (interrupt timing 1)
Figure 5:
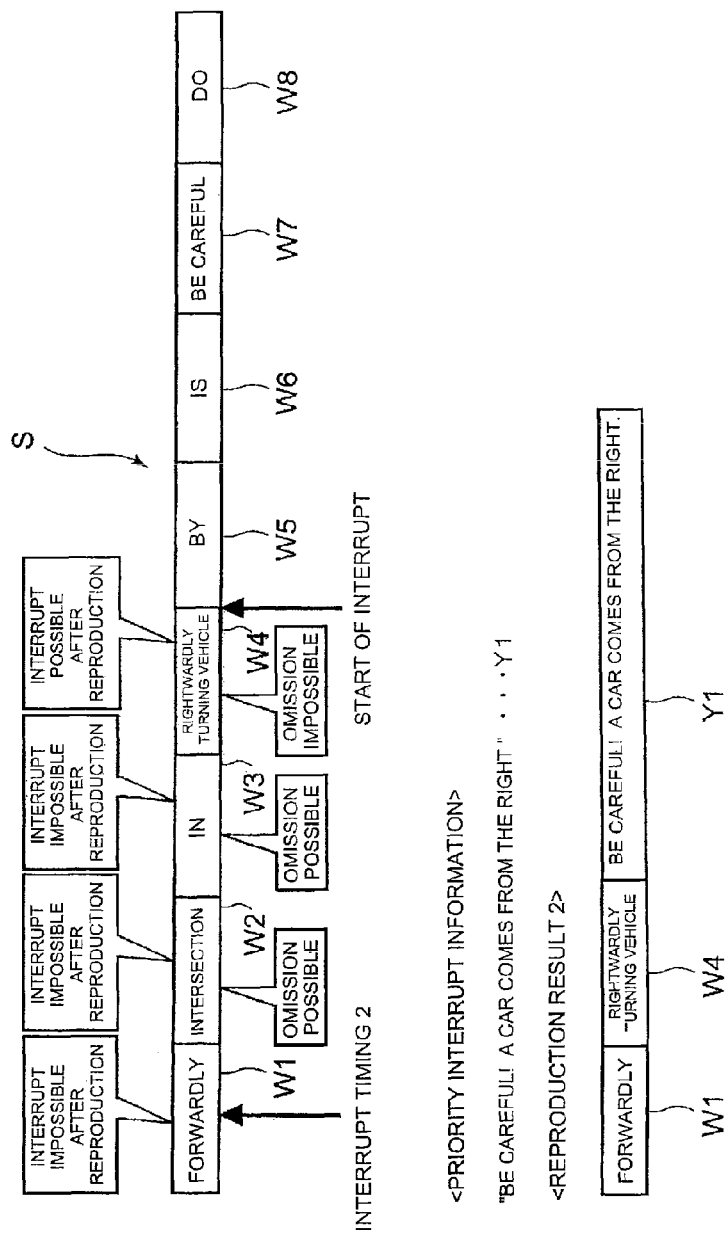
FIG. 5 is a schematic view illustrating a flow of processing in the case where priority interrupt information is inputted during provision of speech information (interrupt timing 2)

FIGS. 4 and 5 are schematic views illustrating a flow of processes in the case where priority interrupt information Y1 is inputted during the provision of speech information set S. Both FIGS. 4 and 5 illustrate a case in which the speech information set S being produced at present is "Be careful! A vehicle to turn to the right is in the forward intersection" and the priority interrupt information Y1 is "Be careful! Another car comes from the right," the priority interrupt information Y1 is inputted at different timings during reproduction of the speech information set S.

In the example of the FIGS. 4 and 5, the speech information set S is configured from totaling eight speech information blocks W1 to W8. The attribute of "interrupt impossible after reproduction" is provided to the "forwardly" of the speech information block W1, the "intersection" of the speech information block W2 and the "in" of the speech information block W3, and the attribute of "interrupt possible after reproduction" is applied to the "right turning vehicle" of the speech information block W4. The attributes are detected by the speech information attribute decision section 7 of the priority interrupt information processing means 6, and re-configuration of the speech information set S which is carried out in response to an interrupt timing is executed by the speech information set re-configuration means 8.

Then, in the case where the priority interrupt information Y1 is inputted (interrupt timing 1) during reproduction of the speech information block W3 as seen in FIG. 4, since the attribute of the speech information block W3 is "interrupt impossible after reproduction," also after the reproduction of the speech information block W3, the priority interrupt information Y1 cannot be reproduced but reproduction of the succeeding speech information block W4 is executed. Then, since the attribute of "interrupt possible after reproduction" is applied to the speech information block W4, reproduction of the priority interrupt information Y1 is executed after reproduction of the speech information block W4 comes to an end.

Consequently, the reproduction result 1 at the interrupt timing 1 illustrated in FIG. 4 becomes "Be careful! A vehicle to turn to the right is in the forward intersection, and another car comes from the right."

It is to be noted that, as described hereinabove, the attribute of "interrupt possible after reproduction" is applied to the nouns (clauses) and the particles (clauses) from among a plurality of speech part units of speech information W stored in the speech information storage section 9. Therefore, for example, such a situation that, immediately before reproduction of the priority interrupt information Y1 is started, such a particle as "by" or "in" is reproduced and consequently the speech information having been reproduced till then and the priority interrupt information Y1 connect to each other in a context, which makes it difficult to grasp meaning of the priority interrupt information Y1, can be prevented.

On the other hand, in the case where the priority interrupt information Y1 is inputted (interrupt timing 2) during reproduction of the speech information block W1 as seen in FIG. 5, since the attribute of the speech information block W1 is "interrupt impossible after reproduction," the priority interrupt information Y1 cannot be reproduced also after the reproduction of the speech information block W1. At this time, if the speech information set S is referred to, then the speech information of the attribute "interrupt possible after reproduction" scheduled to be reproduced subsequently is the "rightwardly turning vehicle" of the speech information block W4. Therefore, at least until after the reproduction of the speech information block W4 comes to an end, the priority interrupt information Y1 cannot be reproduced. However, since, within the array of the speech information set S, the speech information block W2 "intersection" and the speech information block W3 "in" to which the attribute "omission possible" is applied are disposed between the speech information blocks W1 and W4, the speech information set S in which the speech information blocks W2 and W3 are omitted (deleted) is re-constructed by the speech information set re-configuration means 8.

Accordingly, the speech information block W4 is reproduced subsequently to the speech information block W1, and the reproduction result 2 at the interrupt timing 2 illustrated in FIG. 5 becomes "Be careful! A vehicle to turn to the right is forwardly, and another car comes from the right." Consequently, the time after the interrupt timing 2 until the priority interrupt information Y1 is reproduced can be reduced without giving rise to provision of an uncomfortable feeling.

It is to be noted that it is described in regard to the exception of the attribute illustrated in FIG. 3 that the attribute of the speech information "is" changes from "omission possible" to "omission impossible" in the case where it becomes a next word which connects to a particle or an adjective which is currently reproduced. Thus, if the priority interrupt information Y1 is inputted during reproduction of the speech information "by" disposed immediately preceding to the speech information "is," then the attribute of the speech information "by" changes to "omission impossible" in accordance with the exception setting described. Consequently, such a situation that, for example, some other verb or the like than "is" is reproduced immediately after reproduction of the speech information "by" and the meaning of the priority interrupt information Y1 becomes less liable to be recognized can be prevented.

Figure 6:
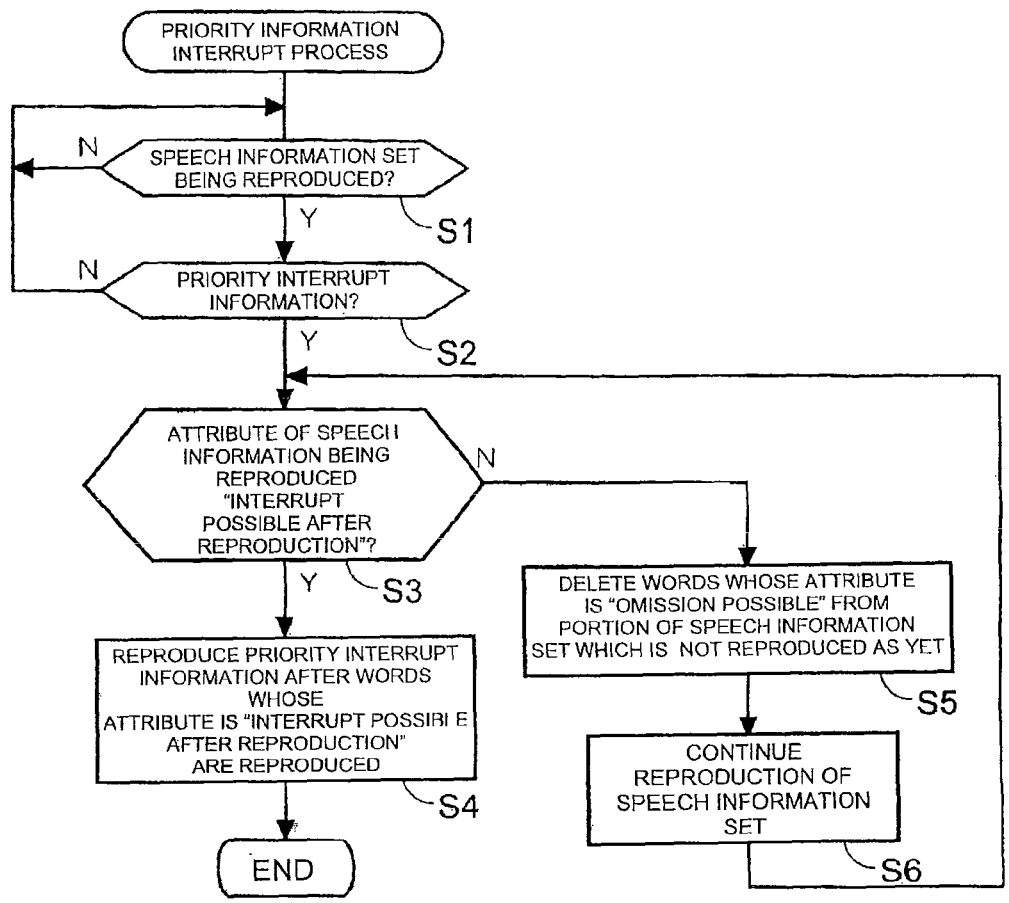
FIG. 6 is a flow chart illustrating a procedure of a priority information interrupt process.

FIG. 6 is a flow chart illustrating a procedure of a priority information interrupt process. At step S1, it is decided whether or not a speech information set S is being reproduced. If an affirmative decision is made, then the processing advances to step S2. At step S2, it is decided by the priority interrupt information processing means 6 whether or not priority interrupt information Y1 is inputted. If an affirmative decision is made, then the processing advances to step S3. It is to be noted that, if a negative decision is made at step S1 or S2, then the processing returns to the decision at step S1.

At step S3, it is decided by the speech information attribute decision section 7 whether or not the attribute of the speech information being reproduced is "interrupt possible after reproduction." If a negative decision is made at step S3, then the processing advances to step S5, at which the speech information set re-configuration means 8 omits those words whose attribute is "omission possible" from a portion of the speech information set S which is not reproduced as yet to re-configure a new speech information set S. At subsequent step S6, reproduction of the re-configured speech information set S is continued, and the processing returns to the decision at step S3.

On the other hand, if an affirmative decision is made at step S3, then the processing advances to step S4, at which the provision information generation means 4 reproduces those words whose attribute is "interrupt possible after reproduction" and then reproduces the priority interrupt information Y1, thereby ending the series of control operations.

It is to be noted that the procedure of the priority information interrupt process can be modified in various manners in response to the type of inputted information and so forth. For example, in the case where the directions to which attention is to be paid are same between the speech information being currently reproduced and the priority interrupt information, if the pieces of information except the direction information are presented continuously together with a new conjunction, then the information can be transmitted smoothly and the uncomfortable feeling can be reduced. In particular, in the case where the speech information being currently reproduced is "Be careful! A vehicle to turn to the right is forwardly" and the priority interrupt information is "Be careful! A stopping car is forwardly," by inserting "and" as a new conjunction, the information can be re-configured into and provided as a sentence of "Be careful! A vehicle to turn to the right and a stopping car are forwardly."

Further, if the speech information of a speech part unit whose attribute is "omission possible" can include the priority interrupt information, then if the number of words to be omitted is suppressed to the minimum and reproduction of the speech information is not interrupted, then the number in times of interruption or the omitted words decrease and the uncomfortable feeling can be reduced further.

As described above, with the information providing apparatus according to the present invention, if the priority interrupt information Y1 having a priority rank higher than the speech information set S being currently provided is inputted, then reproduction of the priority interrupt information Y1 is started after the reproduction of a speech part unit of the speech information being reproduced at least at a point in time at which the priority interrupt information Y1 is inputted. Therefore, it can be prevented that an uncomfortable feeling arises from interruption of reproduction of speech information intermediately of a part of speech.

Further, when the priority interrupt information Y1 whose priority rank is higher than the speech information being currently provided is inputted, if the attribute of a speech part unit of speech information being reproduced when the priority interrupt information Y1 is inputted is "interrupt possible after reproduction," then provision of the priority interrupt information Y1 is started after the speech information of the speech part unit is reproduced. On the other hand, if the attribute of a speech part unit of speech information being reproduced when the priority interrupt information Y1 is inputted is "interrupt impossible after reproduction," then reproduction of the priority interrupt information is started after reproduction of the speech information whose attribute is "interrupt possible after reproduction" scheduled to be reproduced subsequently is started. Therefore, by defining the attribute of "interrupt possible after reproduction" or "interrupt impossible after reproduction" in a speech part unit, the words of the speech information eliminate an uncomfortable feeling or a sudden feeling and it becomes possible for the occupant to recognize the contents of the priority interrupt information more readily.

It is to be noted that the contents of a speech part unit of speech information, the contents of a sentence of a speech information set, the setting method of a priority rank to provision information, the setting of an attribute to the speech information and so forth are not limited to those of the embodiment described above but allow various modifications.

For example, in accordance with priority or contents of the information inputted from the outside of a vehicle, the priority interrupt information processing means can carry out changeover between a method wherein reproduction of priority interruption information is executed at least after reproduction of a speech part unit of speech information comes to an end as in the embodiment of the present application and another method wherein, when priority interruption information is inputted, reproduction of speech information being currently reproduced is interrupted immediately and the priority interrupt information is reproduced in response to a situation. For example, in the case where the speech information being currently reproduced is a weather forecast and the priority interrupt information is a warning with regard to approach of a different vehicle, the types of the information and the words to be used are significantly different from each other. Therefore, even if the weather forecast is interrupted suddenly, the possibility that it may become difficult to recognize the priority interrupt information following the weather forecast is low. Consequently, the time until the priority interrupt information is reproduced after the weather forecast is interrupted immediately can be reduced. It is to be noted that also it is possible to adopt such a configuration that such an interrupt method can be selected arbitrarily by the occupant.

Further, when priority interrupt information is inputted, it is possible to simultaneously provide visual information such as an image, audio information such as a melody for which a reproduction time period longer than a fixed time period is required or a rhythm oscillation by an oscillator or the like. For example, in the case of an image, it can be provided by a cut split, and in the case of a melody, it can be provided by a bar while, in the case of oscillation, it can be provided in a unit of a bar of the rhythm. By this, it is possible to allow the occupant to recognize that the speech information being currently provided is interrupted thereby to enhance the reliability of the information providing apparatus. It is to be noted that the information providing apparatus according to the present invention is particularly suitable for a motorcycle for which information provision by speech information is effective because the installation space for a screen for displaying an image or the like is small. However, also it is possible to apply the information providing apparatus according to the present invention to various vehicles such as saddle type three/four-wheeled automobiles, four-wheeled automobiles having a cabin and so forth.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An information providing apparatus which generates speech information to be provided to an occupant of a vehicle based on various kinds of information inputted to the vehicle, the information providing apparatus comprising:
   a speech information storage section adapted to store a plurality of speech part units of speech information;
   a speech information set generation sections connected to the speech information storage section and being adapted to arrange the speech part units of speech information stored in the speech information storage section in a predetermined order to generate a sentence unit of a speech information set; and
   a priority interrupt information processing section connected to the speech information storage section, and
   when priority interrupt information having a higher priority rank than the speech information set is inputted during a reproduction process of the speech information set, the priority interrupt information processing section is adapted to reproduce the speech information set being currently reproduced and to start a reproduction process of the priority interrupt information; and
   when the priority interrupt information having the higher priority rank than the speech information being currently reproduced is inputted, the priority interrupt information processing section is adapted to reproduce the speech information set being currently reproduced at a point in time later than a point in time at which the priority interrupt information is inputted, and then to start the reproduction process of the priority interrupt information,
   wherein each of the plural speech part units of speech information has either a first attribute or a second attribute applied thereto,
   the first attribute signifying "interrupt possible after reproduction" with which the reproduction process of the priority interrupt information is adapted to be started after the speech information is reproduced, and
   the second attribute signifying "interrupt impossible after reproduction" with which the reproduction process of the priority interrupt information is adapted to be not started even after the speech information is reproduced,
   wherein when the priority interrupt information having the higher priority rank than the speech information set being currently reproduced is inputted, and the speech part unit of speech information has the first attribute applied thereto, the priority interrupt information processing section is adapted to start the reproduction process of the priority interrupt information after the speech part unit is reproduced, and
   when the speech part unit of speech information being reproduced at a point in time at which the priority interrupt information has the second attribute applied thereto, the priority interrupt information processing section is adapted to continue and to complete the reproduction process of the speech information set, and then to start and to complete the reproduction process of the priority interrupt information after the reproduction process of the speech part unit of speech information having the first attribute applied thereto, wherein each of the plural speech part units of speech information has either a third attribute or a fourth attribute further applied thereto, the third attribute signifying "omission possible," and the fourth attribute signifying "omission impossible," and when the priority interrupt information having the higher priority rank than the speech information set being currently reproduced is inputted, and the speech part unit has the first attribute applied thereto, the priority interrupt information processing section is adapted to start the reproduction process of the priority interrupt information after the speech part unit of speech information is reproduced, and when the speech part unit of speech information being reproduced at a point in time at which the priority interrupt information has the second attribute applied thereto, the priority interrupt information processing section is adapted to continue the reproduction process of the speech information set and to omit the speech part unit having the third attribute applied thereto and which is disposed before the speech part unit of speech information having the first attribute applied thereto and which is scheduled to be reproduced subsequently, and then is adapted to start the reproduction process of the priority interrupt information after the reproduction process of the speech part unit having the first attribute applied thereto is completed.

2. The information providing apparatus according to claim 1, wherein, if the priority interrupt information having the higher priority rank than the speech information being currently reproduced is inputted, the priority interrupt information processing section is adapted to start the reproduction process of the priority interrupt information after at least the reproduction process of the speech part unit of speech information being currently reproduced is completed.

3. The information providing apparatus according to claim 2, wherein the speech information storage section applies the fourth attribute to the speech part unit of speech information corresponding to a direction to which an occupant is to pay attention and an object of the attention.

4. The information providing apparatus according to claim 3, wherein the speech information storage section applies the first attribute to the speech part unit of speech information corresponding to a noun, a noun phrase, a verb or a verb phrase.

5. The information providing apparatus according to claim 3, wherein the speech information storage section applies the first attribute to the speech part unit of speech information corresponding to a noun, a noun phrase, a verb or a verb phrase.

6. The information providing apparatus according to claim 2, wherein the speech information storage section applies the first attribute to the speech part unit of speech information corresponding to a noun, a noun phrase, a verb or a verb phrase.

7. The information providing apparatus according to claim 1, wherein the speech information storage section applies the third attribute to the speech part unit of speech information corresponding to a direction to which an occupant is to pay attention and an object of the attention.

8. The information providing apparatus according to claim 7, wherein the speech information storage section applies the first attribute to the speech part unit of speech information corresponding to a noun, a noun phrase, a verb or a verb phrase.

9. The information providing apparatus according to claim 1, wherein the speech information storage section applies the first attribute to the speech part unit of speech information corresponding to a noun, a noun phrase, a verb or a verb phrase.

10. The information providing apparatus according to claim 1, wherein the information providing apparatus is a navigation apparatus which includes wireless communication section for transmitting and receiving various kinds of information inputted to the vehicle from the outside of the vehicle through vehicle-vehicle communication or road-vehicle communication.

11. An information providing method for generating speech information in an information providing apparatus of a vehicle and providing various kinds of information inputted to the vehicle to an occupant of the vehicle, the information providing method comprising the following steps:

arranging a plurality of speech part units of speech information stored in a speech information storage section in a predetermined order to generate a sentence unit of a speech information set to be provided to an occupant of the vehicle;

interrupting a reproduction process of the speech information set being currently reproduced and starting a reproduction process using priority interrupt information if the priority interrupt information has a higher priority rank than the speech information set inputted during the reproduction process of the speech information set; and starting the reproduction process using the priority interrupt information after at least the reproduction process of the speech part units of speech information being reproduced is completed, and preventing the reproduction process using the priority interrupt information from being started after the speech information is reproduced when one of the speech part units has an attribute signifying "interrupt impossible after reproduction,"

the method further comprising:

applying an attribute "omission impossible" to each one of the speech part units of speech information corresponding to a direction to which the occupant is to pay attention and an object of the attention.

12. The information providing method according to claim 11, the method further comprising:

transmitting and receiving various kinds of information through vehicle-vehicle communication or road-vehicle communication.

13. The information providing method according to claim 11, the method further comprising:

applying an attribute "interrupt possible after reproduction" to each one of the speech part units of speech information corresponding to a noun, a noun phrase, a verb or a verb phrase.

14. The information providing method according to claim 11, the method further comprising:

transmitting and receiving various kinds of information inputted to the vehicle from outside of the vehicle through vehicle-vehicle wireless communication paths or road-vehicle wireless communication paths of a navigation apparatus of the vehicle.

* * * * *